United States Patent Office 3,199,434
Patented Aug. 10, 1965

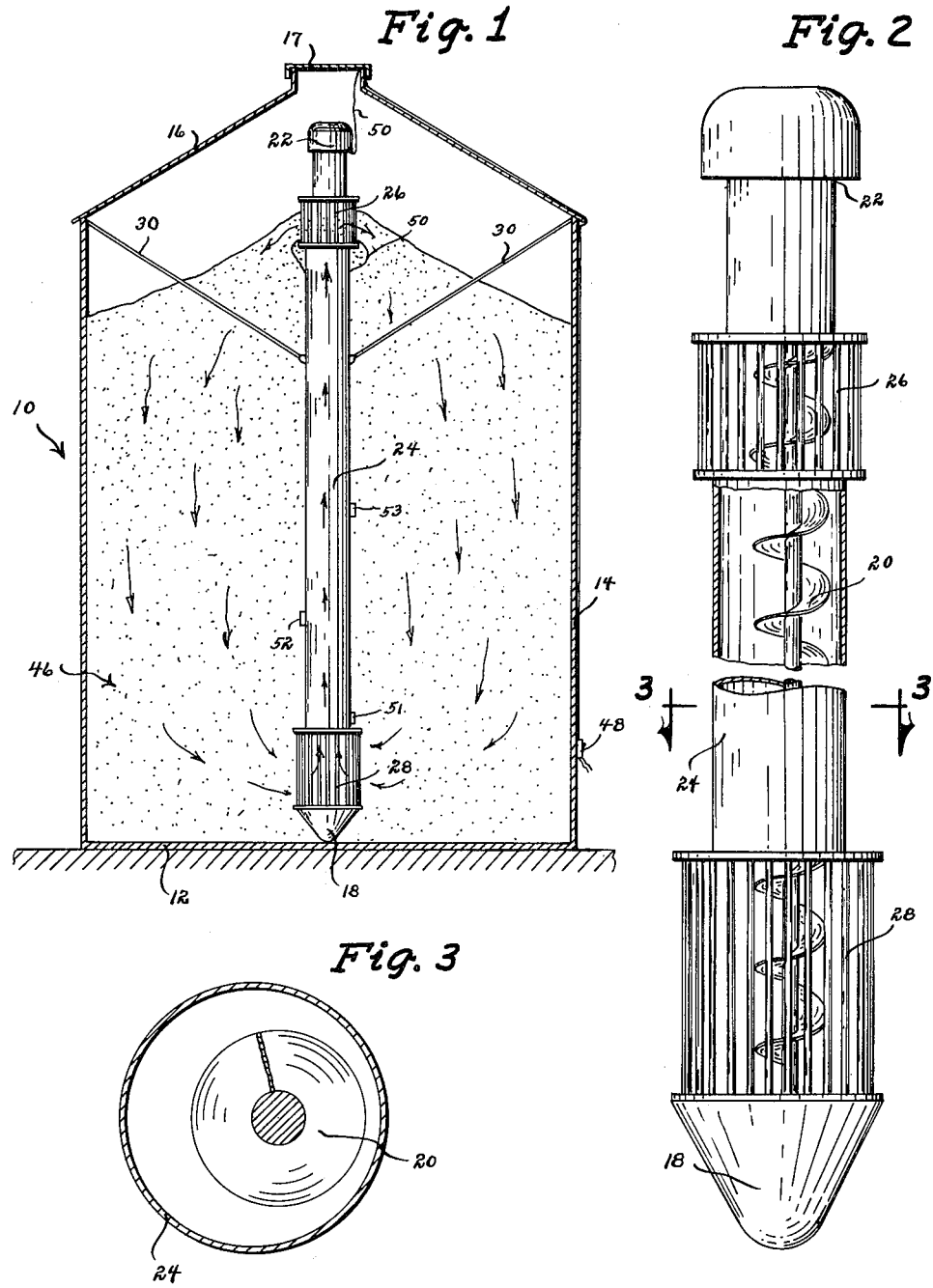

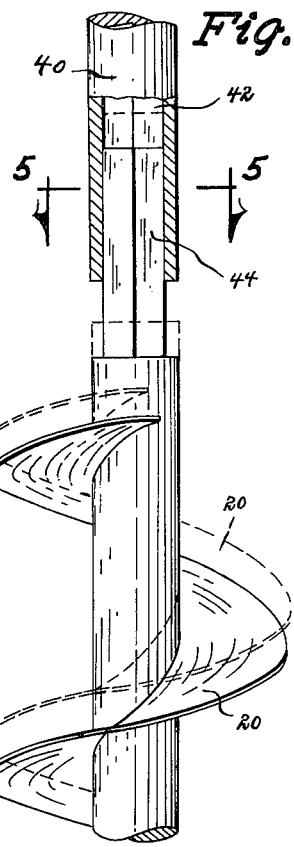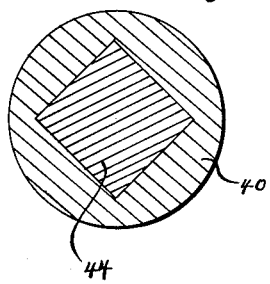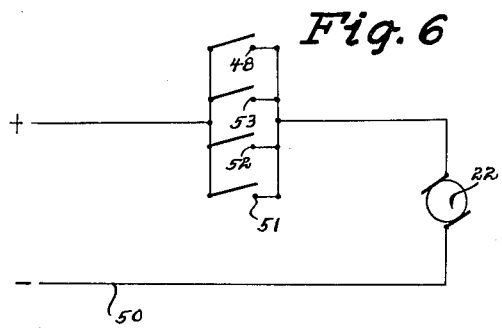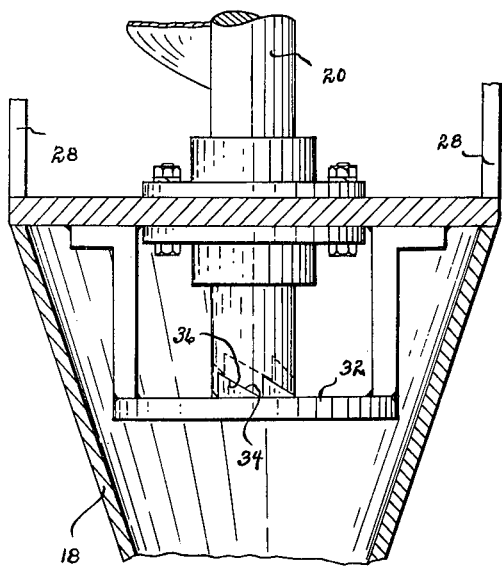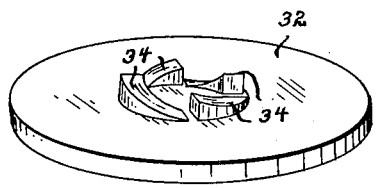
INVENTOR
ALFRED J. PIEL

3,199,434
METHOD OF AND MEANS FOR CONDITIONING STORED MATERIALS
Alfred J. Piel, Hubbard, Iowa
Filed June 18, 1962, Ser. No. 203,369
2 Claims. (Cl. 98—55)

This invention relates to aerating devices for grain storage bins and more particularly to an apparatus than acts directly upon the grain being stored in a sealed bin, housing or like.

In the storing of grain and like particulate material, several problems are encountered. One problem is that grain, after a relatively short period of time settles and packs into a very dense mass which bruises and ruptures the grain. Another problem arising out of the settling and packing of the grain is that the storage bin itself is often bulged outwardly and ruptured. Still another problem encountered is the uneven moisture content of the grain which leads to rotting thereof, the development of "hot" spots, and the consequent hazards of spontaneous combustion.

Therefore, one of the principal objects of my invention is to provide a grain aerating means for sealed storage bins and like, that precludes the grain from settling and packing into a dense mass, especially in the lower area of the compartment.

A further object of this invention is to provide a grain aerating means for storage bins that eliminates the bruising and rupturing of the grain.

A still further object of this invention is to provide a method of aerating grain or like in a bin, without disturbing or dissipating the valuable $CO_2$ gas therein.

A still further object of my invention is to provide a grain aerating means for storage bins that eliminates the problem of the storage bin or housing being bulged outwardly and ruptured.

A still further object of this invention is to provide grain aerating means for storage bins that will maintain uniform moisture content throughout the grain mass being stored.

A still further object of this invention is to provide a means for circulating the grain or like within the bin without damaging the grain or like.

A still further object of my invention is to provide a grain aerating means for storage bins that will prevent the stored grain from spoilage.

A still further object of this invention is to provide a grain aerating means for storage bins that will prevent the hazard of spontaneous combustion of the material being stored.

A still further object of this invention is to provide a method of maintaining uniform temperature throughout the bin or like.

A still further object of my invention is to provide a grain aerating means for storage bins that is economical in manufacture, simple to install, durable in use, and refined in appearance.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawing, in which:

FIG. 1 is a side view of my device installed and in use,

FIG. 2 is an enlarged side view of the device with sections cut away to more fully illustrate its construction.

FIG. 3 is an enlarged cross-sectional view of my device taken on line 3—3 of FIG. 2, FIG. 4 is an enlarged side sectional view of the auger portion of the device, FIG. 5 is an enlarged cross-sectional view of the auger means taken on line 5—5 of FIG. 4, FIG. 6 is an illustrative diagram of the wiring phase of the device, and FIG. 7 is an enlarged perspective view of the cam bearing plate for the lower end of the auger.

In these drawings I have used the numeral 10 to generally designate a storage bin or like having the usual floor 12, wall 14, roof means 16, and sealing cap lid 17. It is within such a storage bin that I utilize my grain aerating means and which I will now describe in detail.

The numeral 18 designates a bearing housing of inverted cone shape and adapted to engage the floor 12. The numeral 20 designates a flat bladed low-pitch spiral auger means that has its lower end rotatably mounted in the bearing housing 18 and from which the auger 20 substantially vertically extends. The auger 20 is sufficiently elongated to extend well above the normal level of the grain or like particulate or fluent material stored in the bin 10. The numeral 22 generally designates a geared electric motor that is operatively connected to the top end of the auger 20 and, as will be hereinafter more specifically set forth, is adapted to rotate the auger 20. The numeral 24 designates a cylinder loosely embracing the auger 20. The numeral 26 designates an open frame fixture operatively connecting the motor housing of the motor 22 and the top of the tube cylinder 24. The numeral 28 designates a second open fixture or frame work operatively connecting the lower end of the cylinder 24 to the housing 18, as shown in FIG. 2. These open frame fixtures 26 and 28 may be of any suitable structure, such as spaced apart rods as shown. By having openings, grain or like may pass into the fixture 28 and out of the fixture 26. The auger 20 is adapted to loosely longitudinally rotatably extend through the pipe cylinder 24, and at least into or through the fixtures 26 and 28. Thus, the pipe 24 extends only a major portion of the way down the auger 20, leaving the lower bottom section of the auger 20 open, and extends only to near the top of the device, leaving the upper end portion of the auger exposed.

The numeral 30 generally designates a plurality of brace support means, such as rods, cables or like, that are operatively secured to and communicate between the device and the upper area of the wall 14. It will be seen that these brace supports 30 operatively retain the auger 20 and its associated elements in an upright position and also keep the casing of the motor housing and the pipe cylinder 24 from rotating. The motor 22, of course, rotates the auger 20.

In order to accentuate the auger action of the auger 20, the bearing housing 18 has a thrust bearing 32 which has its bearing surface (generally designated by the numeral 34) shaped in the form of a step-up plurality of cam lobes. The bottom surface of the auger 20, generally designated by the numeral 36, has a corresponding step-down plurality of cam lobes so that when the auger 20 is rotated, it will also have imparted to it a vertical oscillating movement as well as rotary movement. The elevating of the auger, by these cam surfaces, will be relatively slow but after being raised, it will each time suddenly and rapidly fall to its lower position. This falling action will be sharp and with force. The resultant jarring of the auger will clean it, keep the grain or like successfully moving into and out of the device, and, if the device is lowered into a bin or like that already has stored grain or like, this "bumping" action will cause the device to eat its way downwardly in the stored material. The vertical reciprocation of the auger independent of the motor and cylindrical pipe 24 is accomplished by the drive shaft 40 of the motor, having a longitudinal socket 42, rectangular in cross section and which slidably embraces the upper end 44 of the shaft of the auger 20, and which is also rectangular in cross section, as shown in FIG. 4.

Obviously, the purpose of the auger 20 is to move grain or like from the lower end of the cylinder 24 and exit it from the upper end of the cylinder 24. It is desirable that the material being elevated not "freeze" on and rotate with the auger. If the material did so freeze with the auger, the auger and material would be a mere rotating shaft and no material would move upwardly. To prevent such solidifying of the material and auger, I have the inside diameter of the cylinder 24 much greater than that of the outside diameter of the auger 20, and I have offset the auger from the longitudinal center of the cylinder 24, as shown in FIG. 3. By this arrangement of elements, a greater space area will be at one side of the auger than at the other side of the auger. The material in the cylinder and on the auger could not therefore rotate as a single shaft unit.

Normally, the device will first be installed in a bin, as shown in FIG. 1, and then the grain or like 46 placed in the bin, and sealed by the lid cap 17. The motor 22 is started by the master switch 48 and the auger 20 is rotatably actuated in the proper direction of rotation thereby to draw the grain 46 located at and near the bottom of the storage bin 10 upwardly into and through the pipe 24. With the cylinder 24 filled to overflowing the grain 46 that had been at the bottom of the bin flows through the open cage 26 onto the top level of the grain mass. Thus, it will be seen that substantially all of the grain in the storage bin is kept in a methodical and continual state of agitation and movement. By this process, a uniform moisture content and temperature in the grain mass are maintained as the grain is continually mixed. Also, the grain is thoroughly aerated as it continually passes from the bottom of the bin to its top. As the grain or like is removed from the bottom of the bin, it is progressively replaced by grain from the top area of the bin. The action removes packing pressures in the bottom area of the bin. One most important phase of my method of uniformly conditioning the grain or like in the bin is that one of the desirable gases existing in a granary or like is $CO_2$. This gas which develops in closed bins is a preservative of the grain as well as a service against insects, worms, and like It is heavier than pure air and all effort is made to keep it in the bin. Herebefore, the usual method of conditioning stored grain was to pass air through the grain. This, however, ruins the $CO_2$ content and exits it from the bin. With my means of conditioning the grain, the heavy $CO_2$ gas remains in position in the bin and the movement of the grain does not affect it. My method, therefore, moves the grain through the air and gases while the prior methods left the grain stationary and attempted to blow air through it. Also, by moving the grain it is redeposited in a loosened condition. Various automatic switches may be imposed in the electric circuit 50, such as a pressure actuated switch 51, a temperature actuated switch 52, and a moisture actuated switch 53.

Some changes may be made in the construction and arrangement of my method of and means for conditioning stored materials without departing from the real spirit and purpose of my invention, and it is my intention to cover by my claims, any modified forms of structure or use of mechanical equivalents which may be reasonably including within their scope.

I claim:

1. In a particulate material agitating and aerating means, comprising, in combination,
    a storage bin having a floor and a closed surrounding wall and a top,
    an auger elevator means substantially vertically disposed within said storage bin,
    means for rotating said auger elevator,
    and means for retaining said auger in a substantially upright position;
    said auger mounted on and supported by a thrust bearing disposed on the bottom end of said auger and located on said floor;
    the bearing surface of said thrust bearing being cam lobe shaped and the bottom end surface of said auger being of a corresponding cam lobe shape and wherein said two cam lobe surfaces are adapted to impart a vertical oscillation movement to said auger as it is being rotated.

2. In a device for conditioning the particles of a mass of material in a housing, comprising, in combination,
    a housing adapted to hold the material to be conditioned,
    a vertical auger rotatably mounted in said housing,
    an electric motor operatively secured to said auger,
    an electric circuit connected to said motor and having a temperature actuated switch imposed therein,
    and a cylinder loosely embracing said vertical auger with its top terminating below the top of said auger and its bottom terminating above the bottom of the said auger, said auger mounted on and supported by a thrust bearing disposed on the bottom end of said auger; the bearing surface of said thrust bearing being cam lobe shaped and the bottom end surface of said auger being of a corresponding cam lobe shape and wherein said two cam lobe surfaces are adapted to impart a vertical oscillation movement to said auger as it is being rotated.

References Cited by the Examiner

UNITED STATES PATENTS

| | | | |
|---|---|---|---|
| 2,262,190 | 11/41 | Meade | 98—55 X |
| 2,342,528 | 2/44 | Carbaugh | 98—55 X |
| 3,078,590 | 2/63 | Batterton | 34—174 X |

FOREIGN PATENTS 149,774   8/20   Great Britain.

ROBERT A. O'LEARY, *Primary Examiner.*